3,799,961
PROCESS FOR PRODUCING PALLADIUM (O) AND PLATINUM (O) COMPLEX COMPOUNDS WITH TRIPHENYLPHOSPHINE
Yury Sergeevich Varshavsky, ulitsa Ropshinskaya 1/32, kv. 18, and Nonna Viktorovna Kiseleva, Survorovsky prospekt 51, kv. 4, both of Leningrad, U.S.S.R.
No Drawing. Filed July 6, 1972, Ser. No. 269,403
Int. Cl. C07f 15/00
U.S. Cl. 260—429 R
4 Claims

ABSTRACT OF THE DISCLOSURE

A process for producing palladium (O) and platinum (O) complex compounds with triphenylphosphine of the formula $M(Ph_3P)_4$, wherein M is palladium or platinum, comprising reacting the starting compounds of palladium or platinum such as $PdCl_2$ or $H_2PtCl_6 \cdot XH_2O$, with triphenylphosphine in dimethylformamide medium, followed by treating the reaction mixture with hydrazine hydrate.

The present invention relates to the production of complex compounds of platinum group metals with low degrees of oxidation, and more particularly, to a process for producing palladium (O) and platinum (O) complex compounds with triphenylphosphine corresponding to the formula $M(Ph_3P)_4$, wherein M is palladium or platinum.

Said compounds possess a high reactivity, catalytic activity, and are useful as catalysts for hydrogenation of unsaturated organic compounds, disproportionation of dienes, dimerization of diolefines, hydrocyanation of organosilanes, synthesis of adiponitrile, hydrogen substitution in organosilicon compounds, and the like.

Known in the art are the following processes for producing the compounds $Pd(Ph_3P)_4$ and $Pt(Ph_3P)_4$:

1. Reducing palladium nitrate (II) or palladium oxide (II) with triphenylphosphine in the presence of an alkali in benzene medium (cf. Malatesta, M. Angoletta. J. Chem. Soc. 1186, (1957).

2. Reacting triphenylphosphine with $\pi$-cyclopentadienyl-$\pi$-cyclohexenyl palladium in an inert organic solvent (cf. E. O. Fisher, H. Werner, Chem. Ber., 95, 703 (1962), Germ. Patent No. 1,181,708).

3. Reducing bis (triphenylphosphine) dichloroplatinum (II) with anhydrous hydrazine in the presence of triphenylphosphine in ethanol medium (cf. L. Malatesta, C. Cariello, J. Chem. Soc., 2323 (1958).

4. Reducing potassium tetrachloroplatinate (II) with triphenylphosphine in the presence of an alkali in aqueous ethanol medium (cf. R. Ugo, F. Cariati, G. La Monica, Inorg. Synth. 11, 105 (1968).

5. Reducing potassium tetrachloroplatinate (II) with sodium borohydride in the presence of triphenylphosphine in aqueous ethanol medium (cf. D. T. Rosevear, F. G. A. Stone, J. Chem. Soc. (A), 164 (1968).

6. Reducing palladium (II) or platinum (II) complex compounds with hydrogen in the presence of triphenylphosphine in an inert organic solvent (cf. British Pat. No. 1,181,708).

The main disadvantage of said prior art processes resides in the necessity of carrying out a special synthesis of palladium and platinum compounds used for the production of the desired products. Thus, according to known processes (4) and (5), for the production of the starting compound ($K_2PtCl_4$) it is necessary to carry out two successive preliminary operations, viz precipitating potassium hexachloroplatinate (IV) and reducing thereof to potassium tetrachloroplatinate (II). The production of the starting compound used in the process (2), viz $\pi$-cyclopentadienyl-$\pi$-cyclohexenyl palladium, requires even a greater number of preliminary operations. Therefore, the known processes are multistage ones, i.e., firstly, they require considerable time and labor, and, secondly, involve losses of palladium and platinum which remain in filtrates upon separation of intermediate compounds and should be recovered. Due to such multistage processes the desired product yield, based on the employed amounts of the starting commercial palladium and platinum compounds is quite low.

It is an object of the present invention to provide a process for producing palladium (O) and platinum (O) complex compounds with triphenylphosphine, which enables a direct use, as the starting materials, of easily-available commercial platinum and palladium compounds, and carrying out the reaction in one stage.

Said object has been accomplished by a process for producing palladium (O) and platinum (O) complex compounds with triphenylphosphine by reacting the starting palladium and platinum compounds with triphenylphosphine upon heating in an inert organic solvent medium, followed by treating the reaction mixture with hydrazine; according to the present invention, in this process the inert organic solvent used is dimethylformamide.

Advantages of dimethylformamide are determined by its solvent properties and reactivity with respect to platinum group metal halides with which it reacts as ligand, reducing agent, and carbonylating agent. When heated in dimethylformamide in the presence of triphenylphosphine, the starting palladium and platinum compounds are readily transformed into species which are effectively reduced with hydrazine, thus forming the desired products. Due to high solubility of the starting compounds and low solubility of the final products in dimethylformamide, the conditions for separation of the products are the most favorable with respect to both the completeness of the separation and purity of the resulting products. Effecting the reaction in dimethylformamide medium makes it possible to use, as the starting materials, various halogen derivatives of palladium and platinum, including readily available commercial products such as palladium chloride and platinohydrochloric acid. In addition to their availability, the latter compounds have an advantage, as compared to others (such as $K_2PdCl_4$, $Na_2PtCl_6$), in that they do not form by-products (KCl, NaCl) insoluble in dimethylformamide and contaminating the desired products. In this connection, it is advisable to employ palladium chloride ($PdCl_2$) and platinohydrochloric acid ($H_2PtCl_6 \cdot XH_2O$). Hydrazine should be used in the form of an aqueous solution of a moderate concentration (20 to 25%), since such a solution is readily available. Commercial dimethylformamide may be used without any preliminary purification. The product may be separated from the mother liquor by any suitable method, such as filtration.

Given hereinbelow is a description of the preferred embodiment of the process according to the present invention. Palladium chloride or platinohydrochloric acid is charged into a reactor and then triphenylphosphine (5–6 mmoles per mmole of the platinum or palladium compound) and dimethylformamide (20 to 25 ml. per mmole of the palladium or platinum compound) are added. The reaction mixture is heated to a temperature of from 120° C. to the boiling point of the reaction medium, preferably to 140–150° C. and maintained at this temperature for about 30 minutes. Thereafter, the solution is cooled to 80° to 140° C., preferably to 100° C. and treated with a 20–25% solution of hydrazine hydrate (about 10 mmoles of $N_2H_2$ per mmole of the starting compound). As the hydrazine hydrate is added, the crystallization of the product starts and becomes completed upon further cooling of the solution to room temperature. The resulting crystals are filtered off, washed with ethanol, and dried in air (or in an inert atmosphere: nitrogen, argon). The yield exceeds 90%. The product thus obtained is of analytical purity grade.

As may be seen from the description, the process according to the present invention offers certain advantages, namely:

(1) As the starting materials use may be made directly of readily available commercial compounds of palladium ($PdCl_2$) and platinum ($H_2PtCl_6 \cdot XH_2O$);
(2) The process is rather simple in its technology. All the operations are carried out in succession in the same reactor without separating the intermediates;
(3) The process ensures a high yield of the desired products;
(4) The process simplifies the problem of recovering residual materials, since only mother liquor must be recovered which contains less than 10% of palladium or platinum, as based on the starting amounts thereof.

For a better understanding of the present invention by persons skilled in the art, some specific examples are given hereinbelow by way of illustration.

EXAMPLE 1

Into a conical flask palladium chloride (0.18 g.) and triphenylphosphine (1.58 g.) were charged, treated with dimethylformamide (25 ml.), heated to a temperature of about 140° C., and kept at this temperature over a period of 30 minutes. The solution was cooled to a temperature of about 80° C. and treated with 25% hydrazine hydrate (1 ml.). As the solution was cooled to room temperature, a crystalline product, viz. $Pd(Ph_3P)_4$ was separated therefrom, filtered off, washed with ethanol, and dried in air. The yield was 1.09 g. (95% of the theoretical value). Palladium content was 9.12%; calculated for the $Pd(Ph_3P)_4$, 9.22%.

EXAMPLE 2

Into a conical flask platinohydrochloric acid (0.26 g.) and triphenylphosphine (0.79 g.) were charged, treated with dimethylformamide (10 ml.), heated to a temperature of about 140° C., and kept at this temperature for a period of 30 minutes. The solution was cooled to a temperature of about 110° C. and 25% hydrazine hydrate (1.5 ml.) was added thereto. The solution being cooled to room temperature, a product, viz. $Pt(Ph_3P)_4$ was crystallized therefrom, filtered off, washed with ethanol, and dried in a vacuum-desiccator. The yield of the product was 0.58 g. (93% of the theoretical value). Platinum content is 15.45%, calculated for $Pt(Ph_3P)_4$, 15.68%.

EXAMPLE 3

Into a conical flask potassium hexachloroplatinate (0.24 g.) and triphenylphosphine (1.05 g.) were charged, treated with dimethylformamide (15 ml.), and kept at a temperature of about 150° C. for a period of 30 minutes. Potassium chloride was separated from the solution. Then 25% hydrazine hydrate (0.5 ml.) was added to the reaction mixture. Upon cooling to room temperature a product, viz. $Pt(Ph_3P)_4$ was crystallized from the solution, filtered off, washed with ethanol, water, again with ethanol, and dried in a current of nitrogen. The yield was 0.50 g. (80% of the theoretical value). Platinum content was 15.28%; calculated for $Pt(Ph_3P)_4$, 15.68%.

We claim:

1. A process for producing a palladium (O) or platinum (O) complex compound with triphenylphosphine said complex compound having the formula $M(Ph_3P)_4$, wherein M is palladium or platinum comprising reacting a palladium or platinum halogen compound with triphenylphosphine by heating in dimethylformamide, and treating the reaction mixture with hydrazine hydrate.

2. A process as claimed in claim 1, wherein the palladium halogen compound is $PdCl_2$.

3. A process as claimed in claim 1, wherein the platinum halogen compound is $H_2PtCl_6 \cdot XH_2O$.

4. A process as claimed in claim 1, wherein the palladium or platinum halogen compounds are reacted with triphenylphosphine at a temperature of from 120° C. to the boiling temperature of the reaction mixture, and the treatment with hydrazine hydrate is effected at a temperature of from 80 to 140° C.

References Cited

UNITED STATES PATENTS 3,631,191  12/1971  Kane et al. _____ 260—439 R
3,671,560  6/1972  Fahey _____ 260—429 R DANIEL E. WYMAN, Primary Examiner A. P. DEMERS, Assistant Examiner U.S. Cl. X.R.

252—431 P